United States Patent
Sundara Moorthy et al.

(10) Patent No.: US 12,230,996 B2
(45) Date of Patent: Feb. 18, 2025

(54) LOAD CONTROL DEVICE HAVING A REDUCED LEAKAGE THROUGH GROUND

(71) Applicant: Lutron Technology Company LLC, Coopersburg, PA (US)

(72) Inventors: Dinesh Sundara Moorthy, Allentown, PA (US); James P. Steiner, Royersford, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 98 days.

(21) Appl. No.: 18/309,972

(22) Filed: May 1, 2023

(65) Prior Publication Data

US 2023/0261511 A1    Aug. 17, 2023

Related U.S. Application Data

(60) Continuation of application No. 17/232,700, filed on Apr. 16, 2021, now Pat. No. 11,677,261, which is a continuation of application No. 16/786,287, filed on Feb. 10, 2020, now Pat. No. 10,985,557, which is a continuation of application No. 16/422,935, filed on May 24, 2019, now Pat. No. 10,559,956, which is a division of application No. 15/160,909, filed on May 20, 2016, now Pat. No. 10,305,279.

(60) Provisional application No. 62/164,670, filed on May 21, 2015.

(51) Int. Cl.
*H02J 9/00* (2006.01)
*H02J 3/00* (2006.01)
*H05B 45/50* (2022.01)

(52) U.S. Cl.
CPC .............. *H02J 9/005* (2013.01); *H02J 3/00* (2013.01); *H05B 45/50* (2020.01)

(58) Field of Classification Search
None
See application file for complete search history.

(56) References Cited

U.S. PATENT DOCUMENTS

| | | |
|---|---|---|
| 6,646,843 B1 | 11/2003 | Newman, Jr. et al. |
| 8,694,807 B2 | 4/2014 | Newman, Jr. |
| 8,892,913 B2 | 11/2014 | Newman, Jr. et al. |
| 9,383,068 B2 | 7/2016 | Plourde et al. |

(Continued)

*Primary Examiner* — Jared Fureman
*Assistant Examiner* — Joel Barnett
(74) *Attorney, Agent, or Firm* — Michael S. Czarnecki; Glen R. Farbanish; Philip N. Smith

(57) ABSTRACT

A load control device for controlling power delivered from an AC power source to an electrical device may be configured to conduct current through earth ground and may disconnect a switching circuit to reduce an amount of current conducted through the earth ground. The load control device may comprise a controllably conductive device configured to control the power delivered from the AC power source to the electrical device so as to generate a switched-hot voltage, a switching circuit electrically coupled with a detect circuit, and a control circuit configured to render the switching circuit conductive and nonconductive. The detect circuit may generate a detect signal indicating a magnitude of the switched-hot voltage. The control circuit may be configured to monitor the detect signal and to render the switching circuit non-conductive after detecting an edge on the detect signal to reduce the total current through the earth ground.

24 Claims, 3 Drawing Sheets

(56) References Cited

U.S. PATENT DOCUMENTS

| | | |
|---|---|---|
| 9,426,861 B2 | 8/2016 | Tao et al. |
| 9,538,612 B1 | 1/2017 | Reed |
| 10,305,279 B2 | 5/2019 | Moorthy et al. |
| 10,559,956 B2 | 2/2020 | Moorthy et al. |
| 2007/0296347 A1* | 12/2007 | Mosebrook .......... H05B 39/086 |
| | | 315/209 SC |
| 2008/0024074 A1 | 1/2008 | Mosebrook et al. |
| 2008/0111501 A1* | 5/2008 | Dobbins ............. H05B 39/044 |
| | | 315/131 |
| 2010/0188009 A1 | 7/2010 | Bull |
| 2012/0313535 A1 | 12/2012 | Bedell et al. |
| 2013/0113453 A1 | 5/2013 | Shilling |
| 2013/0181630 A1* | 7/2013 | Taipale ................. H05B 45/10 |
| | | 315/210 |
| 2014/0268474 A1 | 9/2014 | Steiner et al. |
| 2015/0098164 A1 | 4/2015 | Lenig et al. |
| 2016/0205732 A1 | 7/2016 | Zhuang et al. |
| 2016/0295652 A1 | 10/2016 | Zotter |
| 2019/0280480 A1 | 9/2019 | Sundara Moorthy et al. |

\* cited by examiner

LOAD CONTROL DEVICE HAVING A REDUCED LEAKAGE THROUGH GROUND

CROSS REFERENCE TO RELATED APPLICATION

This application is a continuation of U.S. patent application Ser. No. 17/232,700, filed Apr. 16, 2021; which is a continuation of U.S. patent application Ser. No. 16/786,287, filed on Feb. 10, 2020, now U.S. Pat. No. 10,985,557, issued Apr. 20, 2021; which is a continuation of U.S. patent application Ser. No. 16/422,935, filed May 24, 2019, now U.S. Pat. No. 10,559,956, issued on Feb. 11, 2020; which is a divisional of U.S. patent application Ser. No. 15/160,909, filed May 20, 2016, now U.S. Pat. No. 10,305,279, issued May 28, 2019; which claims the benefit of Provisional U.S. Patent Application No. 62/164,670, filed May 21, 2015, the entire disclosures of which are incorporated herein by reference in their entireties.

BACKGROUND

Typical load control devices are operable to control the amount of power delivered to an electrical load, such as a lighting load or a motor load, from an alternating-current (AC) power source. Wall-mounted load control devices are adapted to be mounted to standard electrical wallboxes. A dimmer switch comprises a controllably conductive device (e.g., a bidirectional semiconductor switch, such as, a triac), which is coupled in series between the power source and the load. The controllably conductive device is controlled to be conductive and non-conductive for portions of a half-cycle of the AC power source to thus control the amount of power delivered to the load (e.g., using a phase-control dimming technique). A "smart" dimmer switch (e.g., a digital dimmer switch) comprises a microprocessor (or similar controller) for controlling the semiconductor switch and a power supply for powering the microprocessor. In addition, the smart dimmer switch may comprise a memory, a communication circuit, and a plurality of light-emitting diodes (LEDs) that are powered by the power supply.

An electronic switch (e.g., a digital switch) comprises a controllably conductive device (e.g., a relay or a bidirectional semiconductor switch), a microprocessor, and a power supply. In contrast to a smart dimmer switch, the controllably conductive device of an electronic switch is not controlled using the phase-controlled dimming technique, but is controlled to be either conductive or non-conductive during a half-cycle of the AC power source to thus toggle the electrical load on and off. Wall-mounted digital sensor dimmers and sensor switches may further comprise occupancy detection circuits, such that the dimmers and switches are able to operate as occupancy sensors to automatically turn on lighting loads in response to the presence of an occupant (i.e., an occupancy condition) and automatically turn off the lighting loads in response to detecting the absence of an occupant (i.e., a vacancy condition).

The power supply and control circuitry of some wall-mounted digital sensor dimmers and sensor switches may be configured to conduct current through an earth ground connection. It is desirable to minimize the amount of current conducted through the earth ground connection. For example, standards may limit the amount of current conducted the earth ground connection to approximately 500 µA or less. This may be difficult in some installations, for example, those that include occupancy detection circuits (e.g., which may be a pyroelectric infrared (PIR) detector and/or an ultrasound detector) that require relatively substantial current for operation.

SUMMARY

The present disclosure relates to a load control system for controlling an amount of power delivered to an electrical device (e.g., electrical load), such as a lighting load, and for controlling an amount of power delivered to a switching device for turning the electrical device on and off.

A load control device for controlling power delivered from an AC power source to an electrical device is disclosed herein. The load control device may comprise a first electrical connection adapted to be electrically coupled to a hot side of the AC power source, a second electrical connection adapted to be electrically coupled to the electrical device, a third electrical connection adapted to be electrically coupled to an earth ground connection or a neutral side of the AC power source, and a controllably conductive device electrically coupled between the first and second electrical connections. The controllable conductive device may be configured to control the power delivered from the AC power source to the electrical device so as to generate a switched-hot voltage at the second electrical connection. The load control device may comprise a detect circuit electrically coupled between the second and third electrical connections and configured to generate a detect signal indicating a magnitude of the switched-hot voltage. The load control device may comprise a switching circuit electrically coupled in series with the detect circuit between the second and third electrical connections. The load control device may comprise a control circuit configured to render the switching circuit conductive to cause the detect circuit to begin generating the detect signal. The control circuit may be configured to subsequently monitor the detect signal from the detect circuit and render the switching circuit non-conductive after detecting an edge on the detect signal, e.g., to disconnect the detect circuit from the third electrical connection and to reduce the total current conducted through the third electrical connection.

The load control device may comprise a first hot detect circuit configured to generate a first hot-detect signal, a second hot detect circuit configured to generate a second hot-detect signal, a first switching circuit electrically coupled between the second hot detect circuit, and a connection that is adapted to be electrically coupled to earth ground or a neutral side of the AC power source. The load control device may comprise a control circuit configured to receive the first hot-detect signal and the second hot-detect signal. The control circuit may be configured to render the first switching circuit conductive and non-conductive. The control circuit may be configured to determine whether the first hot-detect signal and the second hot-detect signal are in phase. When the control circuit determines that the first hot-detect signal and the second hot-detect signal are in phase, the control circuit may be configured to render the first switching circuit non-conductive. When the control circuit determines that the first hot-detect signal and the second hot-detect signal are out of phase, the control circuit may be configured to render the first switching circuit conductive.

DETAILED DESCRIPTION

Figure 1:
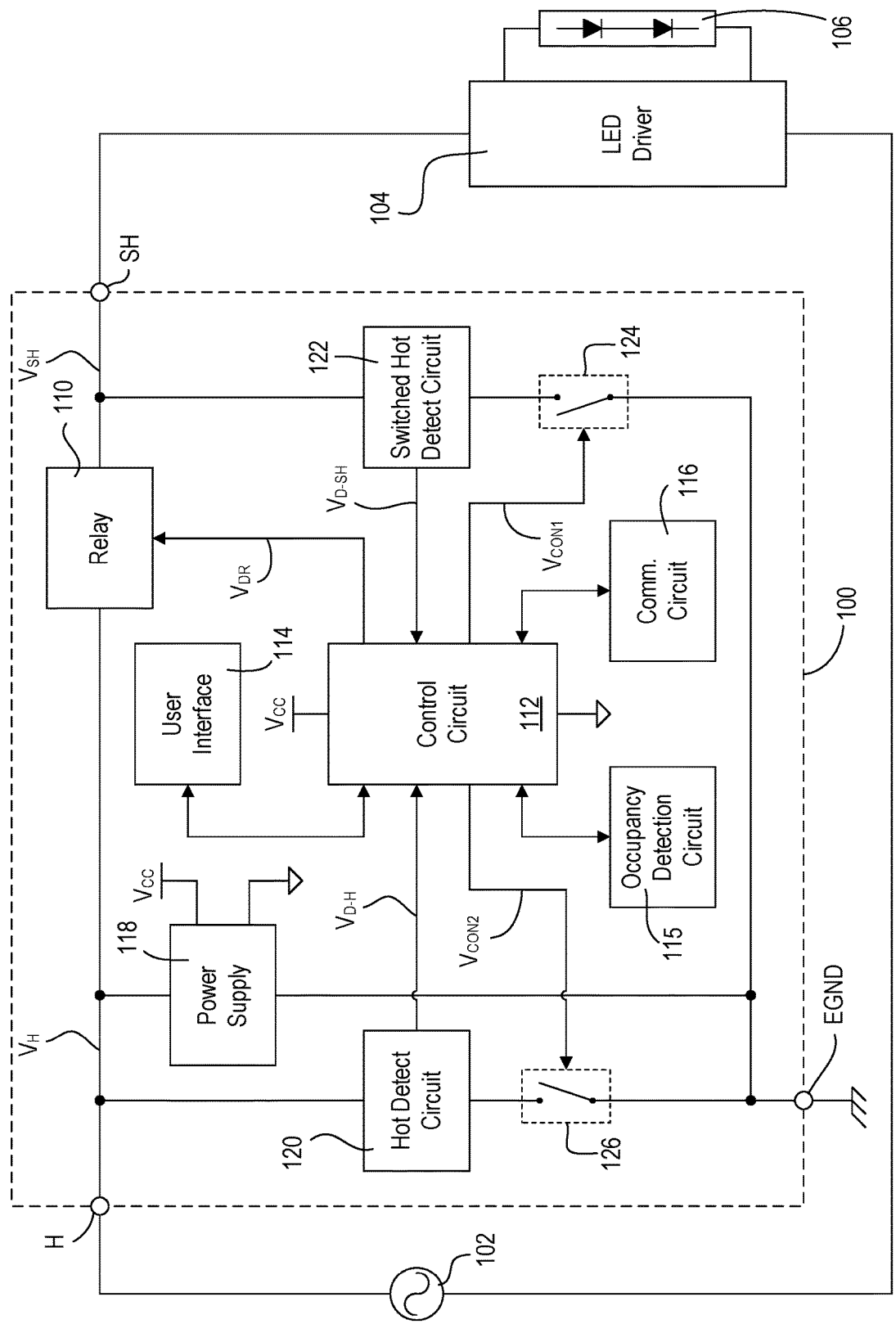
FIG. 1 is a block diagram of an example load control device.

FIG. 1 is a block diagram of an example load control device 100 (e.g., a switching module). The load control device 100 is adapted to be electrically coupled in series between an alternating-current (AC) power source 102 and an electrical device, e.g., an electrical load (such as a lighting load) and/or a load regulation device for an electrical load (such as, an LED driver 104 for an LED light source 106). The load control device 100 may comprise a hot terminal H adapted to be coupled to the hot side of an AC power source 102 for receiving a hot voltage $V_H$, and a switched-hot terminal SH adapted to be coupled to the LED driver 104. The load control device 100 may also comprise an earth ground terminal EGND that may be coupled to an earth ground connection in the electrical wallbox in which the load control device 100 is mounted. The load control device 100 may alternatively or additionally comprise a neutral connection (not shown) adapted to be coupled to a neutral side of the AC power source 102.

The load control device 100 may be configured to control the power delivered from an AC power source to an electrical device. For example as shown in FIG. 1, the load control device 100 may be configured to control the power delivered to the LED driver 104 and the LED light source 106, e.g., to turn the LED light source 106 on and off. The LED driver 104 may be configured to control the amount of power delivered to the LED light source 106, and thus the intensity of the LED light source 106. Examples of LED drivers are described in greater detail in commonly-assigned U.S. Pat. No. 8,492,987, issued Jul. 23, 2013, entitled LOAD CONTROL DEVICE FOR A LIGHT-EMITTING DIODE LIGHT SOURCE, and U.S. Patent Application Publication No. 2014/0009084, published Jan. 9, 2014, entitled FORWARD CONVERTER HAVING A PRIMARY-SIDE CURRENT SENSE CIRCUIT, the entire disclosures of which are hereby incorporated by reference. Alternatively or additionally, the electrical device may include a lighting load (e.g., an incandescent or halogen lamp) and/or an electronic ballast for driving a fluorescent lamp.

The load control device 100 may comprise a controllably conductive device, e.g., a switching circuit, such as a relay 110, electrically coupled in series between the hot terminal H and the switched hot terminal SH for controlling the power delivered from the alternating-current (AC) power source 102 to the LED driver 104 and the LED light source 106. The controllably conductive device may comprise a bidirectional semiconductor switch, such as, for example, a triac, one or more silicon-controlled rectifiers (SCRs), a field-effect transistor (FET) in a rectifier bridge, two FETs in anti-series connection, one or more insulated-gate bipolar junction transistors (IGBTs), or any suitable semiconductor switching circuit.

The load control device 100 may comprise a control circuit 112 coupled to the relay 110 for rendering the relay 110 conductive and non-conductive to control the power delivered to the LED driver 104 and the LED light source 106 (e.g., to turn the LED light source on and off). For example, the control circuit 112 may be configured to generate a drive signal $V_{DR}$ for controlling the relay 110 to be conductive and non-conductive to generate a switched-hot voltage $V_{SH}$ at the switched hot terminal SH. If the relay 110 is a non-latching relay having a single SET coil, the control circuit 112 may be configured to generate a drive signal $V_{DR}$. The drive signal $V_{DR}$ may be driven high (e.g., actively driven high) to render the relay 110 conductive or driven low to render the relay 110 non-conductive. If the relay 110 is a latching relay having SET and RESET coils, the control circuit 112 may generate two drive signals for the SET and RESET coils to render the relay 110 conductive and non-conductive, respectively. If the load control device 100 comprises a bidirectional semiconductor switch (e.g., the bidirectional semiconductor switch may replace the relay 110), the control circuit 112 may be configured to control the bidirectional semiconductor switch to adjust the amount of power delivered to the LED driver 104 and the LED light source 106 (e.g., to adjust the intensity of the LED light source).

The control circuit 112 may comprise any suitable controller or processing device, such as, for example, a microprocessor, a programmable logic device (PLD), a microcontroller, an application specific integrated circuit (ASIC), or a field-programmable gate array (FPGA). The control circuit 112 may also be coupled to a memory (not shown) for storing operational characteristics of the load control device 100. The memory may be implemented as an external integrated circuit (IC) or as an internal circuit of the control circuit 112.

The load control device 100 may comprise a user interface 114 having, for example, one or more buttons (e.g., actuators) for receiving user inputs and one or more visual indicators for providing user feedback. The control circuit 112 may be configured to render the relay 110 conductive and non-conductive to turn the LED light source 106 on and off in response to actuations of the buttons of the user interface. The control circuit 112 may be configured to illuminate the visual indicators of the user interface 114 to provide, for example, a visual representation of the status of the LED driver 104 and/or the LED light source 106 (e.g., whether the LED light source is on or off).

The load control device 100 may further comprise a sensor circuit, e.g., an occupancy detection circuit 115 operable to detect an occupancy or vacancy condition in the vicinity of the load control device. The occupancy detection circuit 115 may comprise a detector (e.g., a pyroelectric infrared (PIR) detector, an ultrasonic detector, and/or a microwave detector) for detecting an occupancy or vacancy condition in the space. For example, a PIR detector may be operable to receive infrared energy from an occupant in the space around the load control device 100 through a lens (not shown) to thus sense the occupancy condition in the space. The control circuit 112 may be configured to determine a vacancy condition in the space around the load control device 100 after a timeout period expires since the last occupancy condition was detected. The control circuit 112 may be configured to turn the LED light source 106 on and off and to adjust the intensity of the LED light source 106 in response to the occupancy detection circuit 115 detecting occupancy and/or vacancy conditions.

The load control device 100 may also comprise a communication circuit 116, e.g., a wireless communication circuit for transmitting and/or receiving wireless signals. For example, the communication circuit 116 may comprise a radio-frequency (RF) transceiver, an RF receiver, an RF transmitter, an infrared (IR) receiver, or other suitable wireless communication circuit. The load control device 100 may be configured to receive the wireless signals from input devices, such as, for example, a battery-powered remote control device and/or a wireless occupancy sensor. The control circuit 112 may be configured to control the LED light source 106 in response to the wireless signals received via the communication circuit 116. Examples of remote wireless occupancy and vacancy sensors are described in greater detail in commonly-assigned U.S. Pat. No. 7,940, 167, issued May 10, 2011, entitled BATTERY-POWERED OCCUPANCY SENSOR; U.S. Pat. No. 8,009,042, issued Aug. 30, 2011, entitled RADIO-FREQUENCY LIGHTING CONTROL SYSTEM WITH OCCUPANCY SENSING; and U.S. Pat. No. 8,199,010, issued Jun. 12, 2012, entitled METHOD AND APPARATUS FOR CONFIGURING A WIRELESS SENSOR, the entire disclosures of which are hereby incorporated by reference. Alternatively or additionally, the communication circuit 116 may comprise a wired communication circuit operable to transmit and receive digital messages over a wired communication link, such as, for example, a serial communication link, an Ethernet communication link, a power-line carrier communication link, or other suitable digital communication link.

The load control device 100 may also be responsive to other types of input devices, such as, for example, daylight sensors, radiometers, cloudy-day sensors, shadow sensors, window sensors, temperature sensors, humidity sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices (e.g., fire protection, water protection, and/or medical emergency devices), power monitoring devices (e.g., power meters, energy meters, utility submeters, and/or utility rate meters), residential, commercial, and/or industrial controllers, interface devices with other control systems (e.g., security systems and emergency alert systems), or any combination of these input devices.

The load control device 100 may further comprise a power supply 118 for generating a direct-current (DC) supply voltage $V_{CC}$ for powering the control circuit 112, the sensor circuit 115, the wireless communication circuit 116, and other low-voltage circuitry of the load control device 100. The power supply 118 may be electrically coupled between the hot terminal H and the earth ground terminal EGND. The power supply 118 may alternatively be electrically coupled between the hot terminal H and a neutral terminal (e.g., rather than between the hot terminal H and the earth ground terminal EGND).

The load control device 100 may further comprise a hot detect circuit 120 and/or a switched-hot detect circuit 122. The hot detect circuit 120 may be coupled between the hot terminal H and the earth ground terminal EGND, and may be configured to generate a hot detect signal $V_{D-H}$ that indicates the magnitude of the hot voltage $V_H$. The switched-hot detect circuit 122 may be coupled between the switched-hot terminal SH and the earth ground terminal EGND, and may be configured to generate a switched-hot detect signal $V_{D-SH}$ that indicates the magnitude of the switched-hot voltage $V_{SH}$. The hot detect circuit 120 and the switched-hot detect circuit 122 may comprise, for example, a zero-cross detect circuit. For example, the hot detect circuit 120 may be configured to drive the hot detect signal $V_{D-H}$ high towards the supply voltage $V_{CC}$ when the magnitude of the hot voltage $V_H$ drops below a hot-detect threshold (e.g., approximately 30 volts), and the switched-hot detect circuit 122 may be configured to drive the switched-hot detect signal $V_{D-SH}$ high towards the supply voltage $V_{CC}$ when the magnitude of the switched-hot voltage $V_{SH}$ drops below a switched-hot-detect threshold (e.g., approximately 30 volts). The hot detect circuit 120 and the switched-hot detect circuit 122 may each be configured to conduct an operating current Iop (e.g., approximately 20 µA) through the earth ground terminal EGND in order to generate the hot detect signal $V_{D-H}$ and the switched-hot detect signal $V_{D-SH}$, respectively.

The control circuit 112 may be configured to receive the hot detect signal $V_{D-H}$ and the switched-hot detect signal $V_{D-SH}$. The control circuit 112 may be configured to determine the times of the zero-crossings of the hot voltage $V_H$ in response to the hot detect signal $V_{D-H}$ to determine when to open and close the relay 110. The control circuit 112 may be configured to measure a half-cycle time period $T_{HC}$ between consecutive zero-crossings and to store the half-cycle time period $T_{HC}$ in memory. The control circuit 112 may be configured to determine if and/or when the relay 110 successfully opened and/or closed in response to the switched-hot detect signal $V_{D-SH}$.

The load control device 100 may further comprise a first switching circuit 124 electrically coupled in series with the switched-hot detect circuit 122. The first switching circuit 124 may be rendered non-conductive to reduce a total leakage current conducted through the earth ground (e.g., $I_L$). The control circuit 112 may be configured to generate a first control signal $V_{CON1}$ for controlling the first switching circuit 124 to open and close. The control circuit 112 may be configured to render the first switching circuit 124 conductive, monitor the switched-hot detect signal $V_{D-SH}$ when the first switching circuit 124 is conductive, and render the first switching circuit 124 non-conductive after detecting an edge on the switched-hot detect signal $V_{D-SH}$. The control circuit 112 may be configured to render the first switching circuit 124 conductive to enable the switched-hot detect circuit 122 to generate the switched-hot detect signal $V_{D-SH}$ and to allow the control circuit 112 to be responsive to the switched-hot detect signal $V_{D-SH}$. The control circuit 112 may be configured to open the first switching circuit 124 when the control circuit 112 does not need to be responsive to the switched-hot detect signal $V_{D-SH}$, such that the switched-hot detect circuit 122 does not conduct the operating current $I_{OP}$ through the earth ground terminal EGND (e.g., to reduce the total leakage current $I_L$ conducted through the earth ground terminal EGND).

The control circuit 112 may be configured to determine if the relay 110 is open or closed by rendering the first switching circuit 124 conductive and monitoring the switched-hot detect signal $V_{D-SH}$ generated by the switched-hot detect circuit 122. For example, the control circuit 112 may be configured to determine if the relay 110 is open or closed at startup by rendering the first switching circuit 124 conductive. The control circuit 112 may be configured to determine that the relay 110 is open if the switched-hot detect circuit 122 is not generating the switched-hot detect signal $V_{D-SH}$ and to determine that the relay 110 is closed if the switched-hot detect circuit 122 is generating the switched-hot detect signal $V_{D-SH}$.

The load control device 100 may also comprise a second switching circuit 126 electrically coupled in series with the hot detect circuit 120 for disconnecting the hot detect circuit to further reduce the total current conducted through the earth ground terminal EGND (e.g., the total leakage current $I_L$). The control circuit 112 may be configured to generate a second control signal $V_{CON2}$ for controlling the second switching circuit 126 to open and close the second switching circuit 126. In some instances, the second switching circuit 126 may be omitted.

The first switching circuit 124 and/or the second switching circuit 126 may comprise a bidirectional semiconductor switch, such as, for example, a triac, one or more silicon-controlled rectifiers (SCRs), a field-effect transistor (FET) in a rectifier bridge, two FETs in anti-series connection, one or more insulated-gate bipolar junction transistors (IGBTs), a half wave rectifier diode in anti-series with a single FET, or any suitable semiconductor switching circuit.

When closing the relay 110, the control circuit 112 may attempt to control the relay such that the contacts of the relay are closed as close as possible to a zero-crossing of the hot voltage $V_H$, e.g., to minimize arcing across the contacts of the relay. There may be a delay between the time at which the control circuit 112 controls the drive signal $V_{DR}$ to close the relay 110 and the time at which the contacts of the relay finally close. This delay may be dependent upon an internal delay of the relay 110 and/or a hardware delay of the load control device 100. In addition, the relay 110 may be characterized by a bounce time period while the contacts of the relay are bouncing, e.g., between the time at which the contacts first make contact with each other and the time at which the contacts stop bouncing. The control circuit 112 may be configured to control the drive signal $V_{DR}$ to close the relay 110 at a time that is within a relay close adjustment time period $T_{CL-ADJ}$ before an upcoming zero-crossing (e.g., at the beginning of the relay close adjustment time period $T_{CL-ADJ}$), such that the relay 110 typically finishes bouncing prior to the upcoming zero-crossing.

The length of the relay close actuation adjustment time period $T_{CL-ADJ}$ may change with time, e.g., as the relay 110 and/or the other electrical components of the load control device 100 age. The control circuit 112 may be configured to measure the delay between the time at which the control circuit 112 controls the drive signal $V_{DR}$ to close the relay 110 and the time at which the contacts of the relay 110 finally close in response to the switched-hot detect signal $V_{D-SH}$ generated by the switched-hot detect circuit 122. The control circuit 112 may be configured to monitor the switched-hot detect signal $V_{D-SH}$ to determine if the relay 110 is closed where desired, e.g., to typically finish bouncing before a zero-crossing of the hot voltage $V_H$. The control circuit 112 may be configured to adjust the relay close adjustment time period $T_{CL-ADJ}$ in response to determining that the relay 110 did not close where desired, e.g., to typically finish bouncing before a zero-crossing of the hot voltage $V_H$. The control circuit 112 may be configured to render the first switching circuit 124 conductive before attempting to close the relay 110, such that the control circuit is able to receive the switched-hot detect signal $V_{D-SH}$ near the zero-crossing at which the control circuit is trying to close the relay 110. The control circuit 112 may be configured to render the first switching circuit 124 non-conductive after detecting an edge of the switched-hot detect signal $V_{D-SH}$ (e.g., after the zero-crossing at which the control circuit is trying to close the relay 110). The control circuit 112 may be configured to monitor the switched-hot detect signal $V_{D-SH}$ (e.g., in order to adjust the relay close adjustment time period $T_{CL-ADJ}$) until the first switching circuit 124 is non-conductive.

When opening the relay 110, the control circuit 112 may be configured to control the drive signal $V_{DR}$ to open the relay 110 at a time that is a relay open adjustment time period $T_{OP-ADJ}$ before an upcoming zero-crossing. The relay open adjustment time period $T_{OP-ADJ}$ may be different from the relay actuation adjustment time period $T_{CL-ADJ}$. When opening the relay 110, the control circuit 112 may be configured to render the first switching circuit 124 conductive before attempting to open the relay, and to render the first switching circuit 124 non-conductive after detecting an edge of the switched-hot detect signal $V_{D-SH}$.

A load control device configured to adjust a relay close adjustment time used to close a relay and a relay open adjustment time used to open a relay is described in greater detail in commonly-assigned U.S. Patent Application Publication No. 2015/0098164, published Apr. 9, 2015, entitled CONTROLLING A CONTROLLABLY CONDUCTIVE DEVICE BASED ON ZERO-CROSSING DETECTION, the entire disclosure of which is hereby incorporated by reference.

The control circuit 112 may be configured to determine a fault condition (e.g., if the relay 110 did not successfully open or close) in response to the switched-hot detect signal $V_{D-SH}$. The control circuit 112 may be configured to render the first switching circuit 124 conductive before attempting to open the relay, and to render the first switching circuit 124 non-conductive after detecting that the relay opened properly or is stuck closed. For example, the control circuit 112 may be configured to determine if the relay opened successfully by monitoring the switched-hot detect signal $V_{D-SH}$ for a detect time period (e.g., approximately 15 milliseconds) after controlling drive signal $V_{DR}$ to render the relay non-conductive. If the control circuit 112 detects that the switched-hot voltage $V_{SH}$ is not present (e.g., the magnitude of the switched-hot voltage is approximately zero volts) at the switched-hot terminal SH at the end of the detect time period, the control circuit 112 may conclude that the relay opened properly and continue normal operation. However, if the switched-hot voltage is present, the control circuit 112 may conclude that the relay 110 is stuck closed and operate in a fault mode. If the control circuit 112 determines that the relay is stuck closed, the control circuit 112 may attempt to fix the stuck relay by periodically attempting to close and/or open the relay for a predetermined number of times. A load control device configured to detect a stuck relay is described in greater detail in commonly-assigned U.S. patent application Ser. No. 15/087,838, filed Mar. 31, 2016, entitled LOAD CONTROL DEVICE HAVING STUCK RELAY DETECTION, the entire disclosure of which is hereby incorporated by reference.

If the relay 100 is a latching relay, the control circuit 112 may or may not know the state of the relay (e.g., the state of being open or closed) in the event of a power failure (e.g., after losing and once again receiving power). The control circuit 112 may be configured to monitor the hot detect signal $V_{D-H}$ and the switched-hot detect signal $V_{D-SH}$ to determine the state of the relay immediately after being powered up. For example, if the control circuit 112 is receiving the hot detect signal $V_{D-H}$, but not the switched-hot detect signal $V_{D-SH}$, the control circuit may conclude that the relay 110 is open. If the control circuit 112 is receiving both of the hot detect signal $V_{D-H}$ and the switched-hot detect signal $V_{D-SH}$, the control circuit may conclude that the relay 110 is closed.

The load control device 100 may be configured to operate correctly even if the hot and switched hot terminals H, SH (as shown in FIG. 1) are wired up backwards (e.g., if the hot terminal H is coupled to the LED driver 104 and the switched-hot terminal SH is coupled to the hot side of the AC power source 102). To enable this functionality, the power supply 118 may be coupled to the hot terminal H and the switched-hot terminal SH via respective diodes, such that the power supply 118 is able to charge if the AC power source 102 is coupled to either of the hot and switched-hot terminals H, SH. After being powered up, the control circuit 112 may be configured to maintain the relay 110 non-conductive and then render the second switching circuit 126 conductive to determine if the hot detect circuit 120 is generating the hot detect signal $V_{D-H}$. If the hot detect circuit 120 is generating the hot detect signal $V_{D-H}$, the control circuit 112 may conclude that the hot terminal H is coupled to the hot side of the AC power source 102 and may control the relay 110 and the first switching circuit 124 during normal operation as described above (e.g., to render the first switching circuit conductive before attempting to close or open the relay, and non-conductive after detecting an edge of switched-hot detect signal $V_{D-SH}$). In addition and for example, the control circuit 112 may render the second switching circuit 126 conductive at all times during normal operation, such that the hot detect circuit 120 always generates the hot detect signal $V_{D-H}$.

If the control circuit 112 determines that the hot detect circuit 120 is not generating the hot detect signal $V_{D-H}$, the control circuit 112 may be configured to render the second switching circuit 126 non-conductive and then render the first switching circuit 124 conductive to determine if the switched-hot detect circuit 122 is generating the switched-hot detect signal $V_{D-SH}$. If the switched-hot detect circuit 122 is generating the switched-hot detect signal $V_{D-SH}$, the control circuit 112 may assume that the hot and switched hot terminals H, SH are wired up backwards, e.g., that the switched-hot terminal SH is coupled to the hot side of the AC power source 102. Thus, during normal operation, the control circuit 112 may render the second switching circuit 126 conductive before attempting to close or open the relay, and non-conductive after detecting an edge of hot detect signal $V_{D-H}$. In addition and for example, the control circuit 112 may render the first switching circuit 124 conductive at all times during normal operation, such that the switched-hot detect circuit 122 always generates the switched-hot detect signal $V_{D-SH}$.

The load control device 100 be configured to control the power to other types of electrical loads, such as, for example, lighting loads (e.g., such as incandescent lamps, halogen lamps, electronic low-voltage lighting loads, and magnetic low-voltage lighting loads); dimming ballasts for driving gas-discharge lamps; table or floor lamps; screw-in luminaires including dimmer circuits and incandescent or halogen lamps; screw-in luminaires including ballasts and compact fluorescent lamps; screw-in luminaires including LED drivers and LED light sources; motor loads, such as ceiling fans and exhaust fans; motorized window treatments; projection screens; motorized interior or exterior shutters; heating and/or cooling systems; heating, ventilation, and air-conditioning (HVAC) systems; air conditioners; compressors; electric baseboard heater controllers; controllable dampers; variable air volume controllers; fresh air intake controllers; ventilation controllers; hydraulic valves for use in radiators and radiant heating system; humidity control units; humidifiers; dehumidifiers; water heaters; boiler controllers; pool pumps; refrigerators; freezers; appliances; televisions; computer monitors; printers; copiers; fax machines; video cameras; audio systems; amplifiers; speakers; overhead projectors; visual presenters; smart boards; coffee makers; toasters; elevators; power supplies; generators; electric chargers; electric vehicle chargers; medical devices, alternative energy controllers, and/or any combination of these electrical loads.

Figure 2:
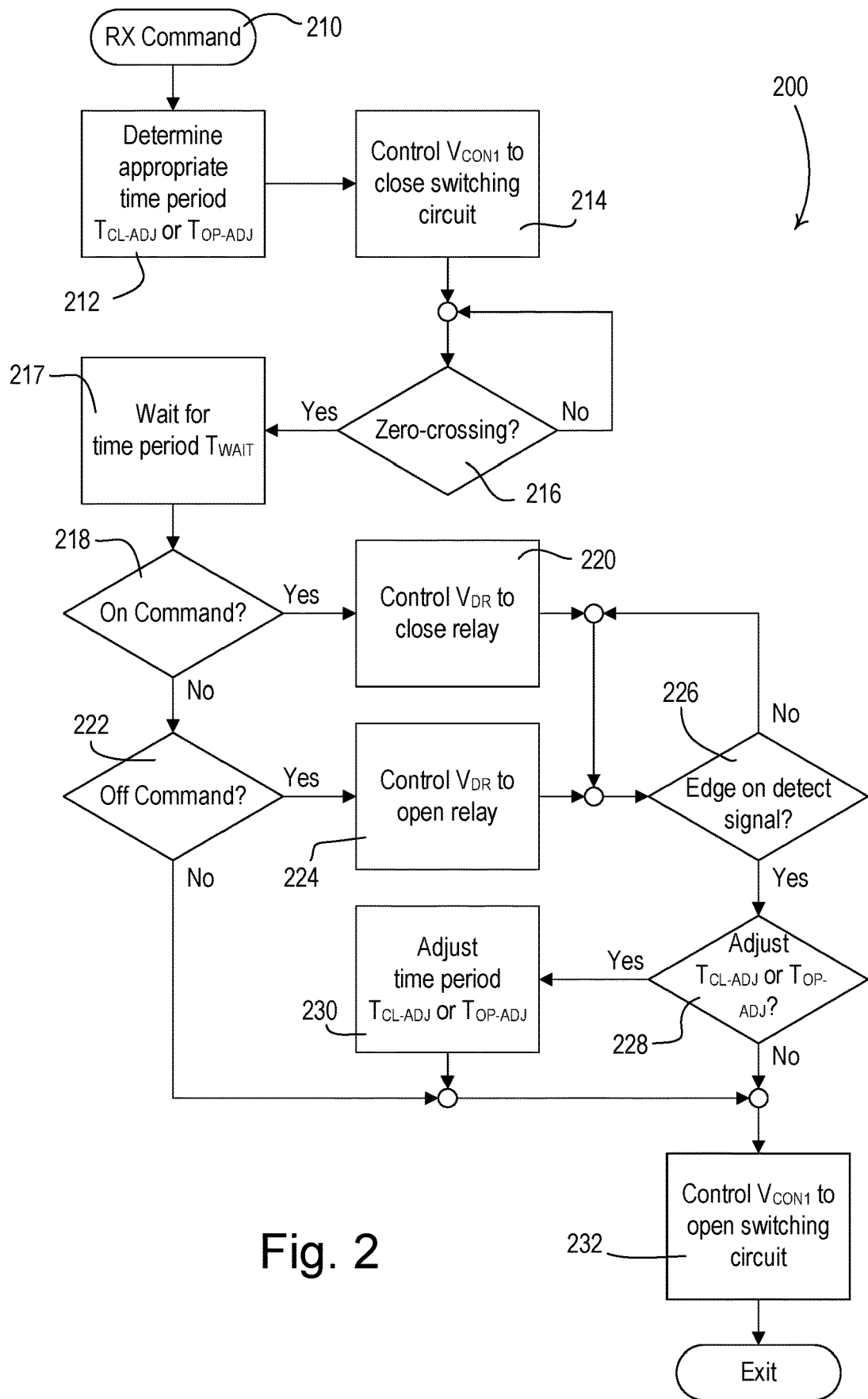
FIG. 2 is a flowchart of an example control procedure.

FIG. 2 is a flowchart of an example command procedure 200 for opening and closing a relay. The command procedure 200 may be executed by a control circuit of a load control device (e.g., the control circuit 112 of the load control device 100) in response to receiving a command at 210 (e.g., via the user interface 114 and/or the communication circuit 116). At 212, the control circuit may be configured to determine an appropriate value for the relay close adjustment time period $T_{CL-ADJ}$ or the relay open adjustment time period $T_{OP-ADJ}$. The relay close adjustment time period $T_{CL-ADJ}$ may be a time period between when the relay drive voltage is adjusted and a subsequent zero-crossing at which the control circuit is attempting to cause the controllably conductive device to become conductive (e.g., a time interval between when the relay closure is initiated and a subsequent zero-crossing). The relay open adjustment time period $T_{OP-ADJ}$ may be a time period between when the relay drive voltage is adjusted and a subsequent zero-crossing at which the control circuit is attempting to cause the controllably conductive device non-conductive (e.g., a time interval between when the relay opening is initiated and a subsequent zero-crossing).

The control circuit may be configured to control the first control signal $V_{CON1}$ to render the first switching circuit 124 conductive at 214, such that the control circuit is able to receive the switched-hot detect signal $V_{D-SH}$. After detecting a zero-crossing at 216 (e.g., in response to the hot detect signal $V_{D-H}$), the control circuit may wait at 217 for a wait time period $T_{WAIT}$, which may be equal to or relatively equal to, for example, the relay close adjustment time period $T_{CL-ADJ}$ minus the half-cycle time period $T_{HC}$ or the relay open adjustment time period $T_{OP-ADJ}$ minus the half-cycle time period $T_{HC}$. The half-cycle time period $T_{HC}$ may be a time period between consecutive zero-crossings (e.g., zero-crossings of $V_{H1}$ and/or $V_{H2}$).

At the end of the wait time period $T_{WAIT}$, the control circuit may be configured to control the drive signal $V_{DR}$ to open or close the relay. If the received command is determined to be an on command at 218, the control circuit may control the drive signal $V_{DR}$ to close the relay at 220. If the relay is a latching relay, the control circuit may generate a first drive signal to drive the SET coil high at 220 and generate a second drive signal to drive the RESET coil high at 224. After controlling the drive signal $V_{DR}$, the control circuit may determine (e.g., wait and determine) whether an edge on the switched-hot detect signal $V_{D-SH}$ appears at 226. When the control circuit receives an edge on the switched-hot detect signal $V_{D-SH}$ at 226, the control circuit may determine if the relay close adjustment time period $T_{CL-ADJ}$ or the relay open adjustment time period $T_{OP-ADJ}$ needs to be adjusted to move the opening and/or closing of the relay closer to the zero-crossing at 228.

If the control circuit determines the relay close adjustment time period $T_{CL-ADJ}$ or the relay open adjustment time period $T_{OP-ADJ}$ needs to be adjusted to move the opening and/or closing of the relay closer to the zero-crossing, the control circuit may, at 230, adjust the relay close adjustment time period $T_{CL-ADJ}$ or the relay open adjustment time period $T_{OP-ADJ}$ appropriately such that the control circuit may use the adjusted close adjustment time period $T_{CL-ADJ}$ or adjusted the relay open adjustment time period $T_{OP-ADJ}$ when the control circuit subsequently attempts to close or open the relay, respectively, and the procedure 200 may go to 232. At 232, the control circuit may control the first control signal $V_{CON1}$ to render a switching circuit (e.g., the first switching circuit 124 in FIG. 1) non-conductive, before the command procedure 200 exits. If the control circuit determines, at 228, that the relay close adjustment time period $T_{CL-ADJ}$ or the relay open adjustment time period $T_{OP-ADJ}$ does not need to be adjusted, the control circuit may control the first control signal $V_{CON1}$ to render a switching circuit (e.g., the first switching circuit 124 in FIG. 1) non-conductive at 232, before the command procedure 200 exits.

If the received command is determined to be an off command at 222, the control circuit may control the drive signal $V_{DR}$ to open the relay at 224. If the control circuit determines that the command is not an on command at 218 or an off command at 222, the control circuit may control the first control signal $V_{CON1}$ to render the first switching circuit 124 non-conductive at 232, before the command procedure 200 exits.

Figure 3:
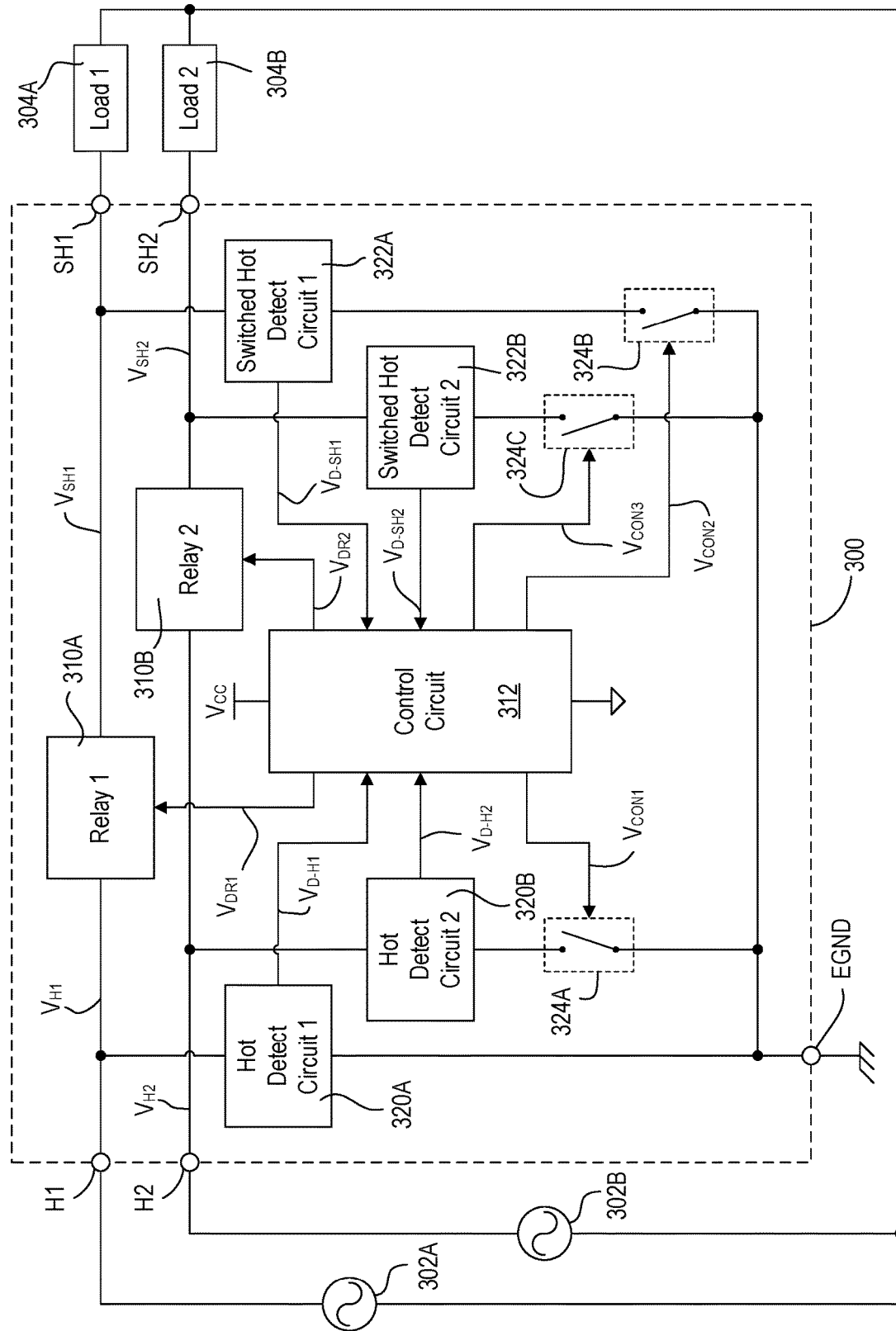
FIG. 3 is a block diagram of another example load control device.

FIG. 3 is a block diagram of an example load control device 300 (e.g., a dual-circuit switching module). The load control device 300 may comprise a first hot terminal H1 adapted to be coupled to the hot side of a first AC power source 302A (e.g., a 120 VAC source) for receiving a first hot voltage $V_{H1}$, and a second hot terminal H2 adapted to be coupled to the hot side of a second AC power source 302B (e.g., a 277 VAC source) for receiving a second hot voltage $V_{H2}$. Alternatively, the first and second hot terminal H1, H2 may be adapted to be coupled to the hot side of a single AC power source. The load control device 300 may comprise an earth ground terminal EGND that may be coupled to an earth ground connection (e.g., the earth ground connection in an electrical wallbox in which the load control device 300 is mounted). The load control device 300 may comprise a neutral connection (not shown) adapted to be coupled to the neutral side of the AC power source 302A and/or 302B. The load control device 300 may further comprise first and second switched-hot terminals SH1, SH2 adapted to be coupled to respective electrical devices (e.g., electrical loads 304A, 304B, and/or load regulation devices).

The load control device 300 may be configured to control the power delivered to the electrical loads 304A, 304B. The load control device 300 may comprise a first controllably conductive device (e.g., a first relay 310A) electrically coupled in series between the first hot terminal H1 and the first switched hot terminal SH1 for controlling the power delivered to the first electrical load 304A. The load control device 300 may comprise a second controllably conductive device (e.g., a second relay 310B) electrically coupled in series between the second hot terminal H2 and the second switched hot terminal SH2 for controlling the power delivered to the second electrical load 304B.

The load control device 300 may comprise a control circuit 312 coupled to the first and second relays 310A, 310B for rendering (e.g., independently) the relays 310A, 310B conductive and non-conductive to control the power delivered to the first and second electrical devices (e.g., loads) 304A, 304B, respectively. For example, the control circuit 312 may be configured to generate a first drive signal $V_{DR1}$ for controlling the first relay 310A to be conductive and non-conductive to generate a first switched-hot voltage $V_{SH1}$ at the first switched hot terminal SH1. The control circuit 312 may be configured to generate a second drive signal $V_{DR2}$ for controlling the second relay 310B to be conductive and non-conductive to generate a second switched-hot voltage $V_{SH1}$ at the second switched hot terminal SH2. The control circuit 312 may comprise any suitable controller or processing device, such as, for example, a microprocessor, a programmable logic device (PLD), a microcontroller, an application specific integrated circuit (ASIC), or a field-programmable gate array (FPGA). The control circuit 312 may also be coupled to a memory (not shown) for storing operational characteristics of the load control device 300. The memory may be implemented as an external integrated circuit (IC) or as an internal circuit of the control circuit 312.

While not shown in FIG. 3, the load control device 300 may also comprise a user interface, an occupancy detection circuit, and/or a communication circuit that are similar to the user interface 114, the occupancy detection circuit 115, and the communication circuit 116, respectively, of the load control device 100 shown in FIG. 1. In addition, the load control device 300 may further comprise a power supply (not shown) configured to generate a direct-current (DC) supply voltage $V_{CC}$ for powering the circuitry of the load control device 300. The power supply may, for example, be electrically coupled between the first hot terminal H1 and the earth ground terminal EGND.

The load control device 300 may comprise a first hot detect circuit 320A electrically coupled between the first hot terminal H1 and the earth ground terminal EGND, and a second hot detect circuit 320B electrically coupled between the second hot terminal H2 and the earth ground terminal EGND. The first and second hot detect circuit 320A, 320B may be configured to generate respective first and second hot detect signals $V_{D-H1}$, $V_{D-H2}$ that indicate the magnitude of the voltages at the first and second hot terminals H1, H2, respectively. The load control device 300 may further comprise a first switching circuit 324A. The first switching circuit 324A may be electrically coupled in series with one of the hot detect circuits 320A and 320B. For example, the first switching circuit 324A may be electrically coupled in series with the second hot detect circuit 320B, as shown in FIG. 3. While not shown in FIG. 3, the load control device 300 may also comprise a switching circuit electrically coupled in series with the first hot detect circuit 320A.

The control circuit 312 may be configured to generate a first control signal $V_{CON1}$ for controlling the first switching circuit 324A, a second control signal $V_{CON2}$ for controlling the second switching circuit 324B, and a third control signal $V_{CON3}$ for controlling the third switching circuit 324C. The control circuit 312 may be configured to close the first switching circuit 324A to enable the second hot detect circuit 320B to generate the second hot detect signal $V_{D-H2}$. The control circuit 312 may be configured to close the second switching circuit 324B to enable the first switched-hot detect circuit 322A to generate the first switched-hot detect signal $V_{D-SH1}$. The control circuit 312 may be configured to close the third switching circuit 324C to enable the second switched-hot detect circuit 322B to generate the second switched-hot detect signal $V_{D-SH2}$.

The load control device 300 may further comprise a first switched-hot detect circuit 322A electrically coupled between the first switched-hot terminal SH1 and the earth ground terminal EGND, and a second switched-hot detect circuit 322B electrically coupled between the second switched-hot terminal SH2 and the earth ground terminal EGND. The first and second switched-hot detect circuit 322A, 322B may be configured to generate respective first and second switched-hot detect signals $V_{D-SH1}$, $V_{D-SH2}$ that indicate the magnitude of the voltages at the first and second switched-hot terminals SH1, SH2, respectively. The hot detect circuits 320A, 320B and the switched-hot detect circuits 322A, 322B may comprise, for example, a zero-cross detect circuit, and may be similar to the hot detect circuit 120 and the switched-hot detect circuit 122 described above with reference to FIG. 1. The load control device 300 may further comprise a second switching circuit 324B and a third switching circuit 324C. For example, the second switching circuit 324B may be electrically coupled in series with the first switched-hot detect circuit 322A, and a third switching circuit 324C may be electrically coupled in series with the second switched-hot detect circuit 322B.

The control circuit 312 may be configured to receive the first and second hot detect signals $V_{D-H1}$, $V_{D-H2}$ and the first and second switched-hot detect signals $V_{D-SH1}$, $V_{D-SH2}$. The control circuit 312 may be configured to determine times of zero-crossings of the first and second hot voltages $V_{H1}$, $V_{H2}$ in response to the respective first and second hot detect signal $V_{D-H1}$, $V_{D-H2}$ to determine when to open and close the relay of the first and second relays 310A, 310B, respectively. The control circuit 312 may be configured to determine if and/or when the relays 310A, 310B successfully opened and/or closed in response to the switched-hot detect signals $V_{D-SH1}$, $V_{D-SH2}$. The control circuit 312 may render the second switching circuit 324B non-conductive, e.g., when the control circuit 312 determines that the relay 310A successfully opened and/or closed in response to the switched-hot detect signal $V_{D-SH1}$. The control circuit 312 may render the third switching circuit 324C non-conductive, e.g., when the control circuit 312 determines that the relay 310B successfully opened and/or closed in response to the switched-hot detect signal $V_{D-SH2}$. When the control circuit 312 renders one or more of the second switching circuit 324B or the third switching circuit 324C non-conductive, the current conducted through the earth ground terminal EGND (e.g., total leakage current $I_L$) may be reduced.

The control circuit 312 may reduce the leakage current conducted through the earth ground terminal EGND (e.g., total leakage current $I_L$), for example, by opening one or more of the first, second, and third switching circuits 324A, 324B, 324C. The control circuit 312 may open one or more of the first, second, and third switching circuits 324A, 324B, 324C when the control circuit 312 does not need to be responsive to the respective detect signals $V_{D-H2}$, $V_{D-SH1}$, $V_{D-SH2}$. For example, the control circuit 312 may be configured to open the first switching circuit 324A when the control circuit 312 does not need the second hot detect circuit 320B to generate the second hot detect signal $V_{D-H2}$. When the first switching circuit 324A is open, a path for potential leakage current conducted through the earth ground terminal EGND is removed. For example, the control circuit 312 may not need the second hot detect circuit 320B to generate the second hot detect signal $V_{D-H2}$ when the first hot-detect signal $V_{D-H1}$ and the second hot-detect signal $V_{D-H2}$ are in phase, as described in more detail herein The control circuit 312 may be configured to determine whether the relays 310A and/or 310B are open or closed at the startup by closing one or more of the first, second, and third switching circuits 324A, 324B, 324C.

The control circuit 312 may reduce the leakage current conducted through the earth ground terminal EGND (e.g., total leakage current $I_L$) by opening the second switching circuit 324B and/or the third switching circuit 324C. For example, the control circuit 312 may be configured to open the second switching circuit 324B when the control circuit 312 does not need the first switched-hot detect circuit 322A to generate the first switched-hot detect signal $V_{D-SH1}$. The control circuit 312 may be configured to open the third switching circuit 324C when the second switched-hot detect circuit 322B does not need to generate the second switched-hot detect signal $V_{D-SH2}$. For example, the control circuit 312 may not need the first switched-hot detect signal $V_{D-SH1}$ when the relay 310A is not being adjusted (e.g., resting in the open or closed position), and/or when the control circuit 312 determines that the timing for delivering power from the AC power source 302A to the electrical device 304A (e.g., $T_{CL-ADJ1}$ and/or $T_{OP-ADJ1}$) does not need to be adjusted. Similarly, the control circuit 312 may not need the second switched-hot detect signal $V_{D-SH2}$ when the relay 310B is not being adjusted (e.g., resting in the open or closed position), and/or when the control circuit determines that the timing for delivering power from the AC power source 302B to the electrical device 304B (e.g., $T_{CL-ADJ2}$ and/or $T_{OP-ADJ2}$) does not need to be adjusted.

The control circuit 312 may be configured to determine whether the first hot-detect signal $V_{D-H1}$ and the second hot-detect signal $V_{D-H2}$ are in phase (e.g., and, for example, are the same or different magnitudes, e.g., voltages). The determination whether $V_{D-H1}$ and $V_{D-H2}$ are in phase may be performed at the startup. For example, the first hot terminal H1 and the second hot terminal H2 may be connected to different AC power sources (e.g., as shown in FIG. 3), which may be in phase or out-of-phase with one another. Alternatively, the first hot terminal H1 and the second hot terminal H2 may be connected to the same or different phases of a single AC power source (e.g., a single or multi-phase AC power source). As such, the first hot-detect signal $V_{D-H1}$ (e.g., the first hot terminal H1) may be characterized by a first phase and the second hot-detect signal $V_{D-H2}$ (e.g., the second hot terminal H2) may be characterized by a second, possibly different phase. The control circuit 312 may be configured to determine whether the first hot-detect signal $V_{D-H1}$ and the second hot-detect signal $V_{D-H2}$ are in phase, e.g., by comparing the respective first and second hot detect signals $V_{D-H1}$, $V_{D-H2}$ and determining the respective zero-crossing times of the first and second hot voltages $V_{H1}$, $V_{H2}$. If the control circuit 312 determines that the zero-crossing times of the first and second hot voltages $V_{H1}$, $V_{H2}$ are the same, then the control circuit 312 may determine that the first and hot-detect signals $V_{D-H1}$, $V_{D-H2}$ are in phase.

When the control circuit determines that the first and second hot-detect signals $V_{D-H1}$, $V_{D-H2}$ are in phase, the control circuit 312 may be configured to render the first switching circuit 324A non-conductive (e.g., which may reduce the current conducted through the earth ground terminal EGND (e.g., total leakage current $I_L$). For example, when the first hot-detect signal $V_{D-H1}$ and the second hot-detect signal $V_{D-H2}$ are in phase, the control circuit 312 can rely on the first hot detect signal $V_{D-H1}$ to determine zero-crossing events for both the first and second hot voltages $V_{H1}$, $V_{H2}$. When the control circuit 312 determines that the first hot-detect signal $V_{D-H1}$ and the second hot-detect signal $V_{D-H2}$ are out of phase, the control circuit 312 may be configured to render the first switching circuit 324A conductive. Alternatively or additionally, even if the control circuit 312 determines that the first hot-detect signal $V_{D-H1}$ and the second hot-detect signal $V_{D-H2}$ are out of phase, the control circuit 312 may be configured to keep the first switching circuit 324A open (e.g., non-conductive) until the control circuit 312 receives a user input via the user interface indicating that the relay 310B is to be closed. Upon receiving a user input indicating that the relay 310B is to be closed, the control circuit 312 may render the first switching circuit 324A conductive, which, for example, may allow the control circuit 312 to determine a zero-crossing event of the hot voltage $V_{H2}$ (e.g., and in turn, close the relay 310B as close to a zero-crossing event as possible).

The control circuit 312 may be configured to independently open and close the first, second, and third switching circuits 324A, 324B, 324C (e.g., at different times), or may control the open the first, second, and third switching circuits 324A, 324B, 324C in unison (e.g., at the same time). For example, the control circuit 312 may be configured to generate a first control signal $V_{CON1}$ for rendering the first switching circuit 324A conductive and non-conductive (e.g., open and closed), a second control signal $V_{CON2}$ for rendering the second switching circuit 324B conductive and non-conductive conductive (e.g., open and closed), and a third control signal $V_{CON3}$ for controlling the third switching circuit 324C conductive and nonconductive (e.g., open and closed). Alternatively, the control circuit 312 may be configured to generate a single control signal for rendering two or more of the first, second, and third switching circuits 324A, 324B, 324C conductive and non-conductive (e.g., at the same time). The use of a single control signal for rendering two or more of the switching circuits 324A, 324B, 324C conductive and/or non-conductive may, for example, be beneficial if the control circuit includes a microprocessor that has a limited number of ports.

When closing the relays 310A, 310B, the control circuit 312 may attempt to control the relays such that the contacts of the relays are closed as close as possible to zero-crossings of the respective hot voltage $V_{H1}$, $V_{H2}$ (e.g., similar as described above with respect to FIG. 1). The control circuit 312 may be configured to control the first drive signal $V_{DR1}$ at a time that is a first relay close adjustment time period $T_{CL-ADJ1}$ before an upcoming zero-crossing, so as to attempt to close the first relay 310A at the upcoming zero-crossing. The control circuit 312 may be configured to control the second drive signal $V_{DR2}$ at a time that is a second relay close adjustment time period $T_{CL-ADJ2}$ before an upcoming zero-crossing, so as to attempt to close the second relay 310B at the upcoming zero-crossing. The control circuit 312 may be configured to monitor the first and second switched-hot detect signals $V_{D-SH1}$, $V_{D-SH2}$ to determine if the relays 310A, 310B are closed where desired, e.g., to typically finish bouncing before the zero-crossing. The control circuit 112 may be configured to adjust the relay close adjustment time periods $T_{CL-ADJ1}$, $T_{CL-ADJ2}$ in response to determining that the respective relay 310A, 310B did not close where desired.

The control circuit 312 may be configured to render the first, second, and/or third switching circuits 324A, 324B, and/or 324C conductive before attempting to close the first and/or second relays 310A, 310B. When controlling the first relay 310A, the control circuit 312 may be configured to render the second switching circuit 324B conductive before attempting to close the first relay 310A, such that the control circuit 312 is able to monitor the first switched-hot detect signal $V_{D-SH1}$ near the zero-crossing at which the control circuit is trying to close the first relay 310A. The control circuit 312 may be configured to render the second switching circuit 324B non-conductive after detecting an edge of first switched-hot detect signal $V_{D-SH1}$ (e.g., after the zero-crossing at which the control circuit is trying to close the first relay 310A).

When controlling the second relay 310B and when the first hot-detect signal $V_{D-H1}$ and the second hot-detect signal $V_{D-H2}$ are in phase, the control circuit 312 may be configured to render the third switching circuit 324C conductive before attempting to close the second relay 310B (e.g., and leave the first switching circuits 324A open), such that the control circuit 312 is able to receive the second switched-hot detect signal $V_{D-SH2}$ near the zero-crossing at which the control circuit is trying to close the second relay 310B. Further, the control circuit 312 may receive the first hot detect signal $V_{D-H1}$ before controlling the second drive signal $V_{DR2}$ (e.g., to determine zero-crossing of the second hot voltage $V_{H2}$). The control circuit 312 may be configured to render the third switching circuits 324C non-conductive after detecting an edge of second switched-hot detect signal $V_{D-SH2}$ (e.g., after the zero-crossing at which the control circuit is trying to close the second relay 310B).

When controlling the second relay 310B and when the first hot-detect signal $V_{D-H1}$ and the second hot-detect signal $V_{D-H2}$ are out of phase, the control circuit 312 may be configured to render the first and third switching circuits 324A, 324C conductive before attempting to close the second relay 310B, such that the control circuit 312 is able to receive the second hot detect signal $V_{D-H2}$ before controlling the second drive signal $V_{DR2}$, and to receive the second switched-hot detect signal $V_{D-SH2}$ near the zero-crossing at which the control circuit is trying to close the second relay 310B. The control circuit 312 may be configured to render the third switching circuits 324C non-conductive after detecting an edge of second switched-hot detect signal $V_{D-SH2}$ (e.g., after the zero-crossing at which the control circuit is trying to close the second relay 310B).

When controlling the first relay 310A and the second relay 310B, and when the first hot-detect signal $V_{D-H1}$ and the second hot-detect signal $V_{D-H2}$ are in phase, the control circuit 312 may be configured to render the second switching circuit 324B and the third switching circuit 324C conductive before attempting to close the first relay 310A and the second relay 310B. The control circuit 312 may receive the first hot detect signal $V_{D-H1}$ before controlling the first and second drive signals $V_{DR1}$, $V_{DR2}$. The control circuit 312 may be able to monitor the first switched-hot detect signal $V_{D-SH1}$ near the zero-crossing at which the control circuit is trying to close the first relay 310A. The control circuit 312 may be configured to render the second switching circuit 324B non-conductive after detecting an edge of first switched-hot detect signal $V_{D-SH1}$ (e.g., after the zero-crossing at which the control circuit is trying to close the first relay 310A). The control circuit 312 may monitor the second switched-hot detect signal $V_{D-SH2}$ near the zero-crossing at which the control circuit is trying to close the second relay 310B. The control circuit 312 may be configured to render the third switching circuits 324C non-conductive after detecting an edge of second switched-hot detect signal $V_{D-SH2}$ (e.g., after the zero-crossing at which the control circuit is trying to close the second relay 310B).

When controlling the first relay 310A and the second relay 310B, and when the first hot-detect signal $V_{D-H1}$ and the second hot-detect signal $V_{D-H2}$ are out of phase, the control circuit 312 may be configured to render the first switching circuit 324A, the second switching circuit 324B, and the third switching circuit 324C conductive before attempting to close the first relay 310A and the second relay 310B. The control circuit 312 may monitor the first switched-hot detect signal $V_{D-SH1}$ near the zero-crossing at which the control circuit is trying to close the first relay 310A. The control circuit 312 may be configured to render the second switching circuit 324B non-conductive after detecting an edge of first switched-hot detect signal $V_{D-SH1}$ (e.g., after the zero-crossing at which the control circuit is trying to close the first relay 310A). The control circuit 312 may monitor the second hot detect signal $V_{D-H2}$ before controlling the second drive signal $V_{DR2}$, and to receive the second switched-hot detect signal $V_{D-SH2}$ near the zero-crossing at which the control circuit is trying to close the second relay 310B. The control circuit 312 may be configured to render the third switching circuits 324C non-conductive after detecting an edge of second switched-hot detect signal $V_{D-SH2}$ (e.g., after the zero-crossing at which the control circuit is trying to close the second relay 310B).

When opening the first and second relays 310A, 310B, the control circuit 312 may be configured to control the first drive signal $V_{DR1}$ to open the first relay 310A at a time that is a first relay open adjustment time period $T_{OP-ADJ1}$ before an upcoming zero-crossing, and to control the second drive signal $V_{DR2}$ to open the second relay 310B at a time that is a second relay open adjustment time period $T_{OP-ADJ2}$ before an upcoming zero-crossing. When opening the first relay 310A, the control circuit 312 may be configured to render the second switching circuit 324B conductive before attempting to open the first relay, and to render the second switching circuit 324B non-conductive after detecting an edge of first switched-hot detect signal $V_{D-SH1}$. When opening the second relay 310B, the control circuit 312 may be configured to render the first and third switching circuits 324A, 324C conductive before attempting to open the first relay, and to render the first and third switching circuits 324A, 324C non-conductive after detecting an edge of second switched-hot detect signal $V_{D-SH2}$. Further, in one or more embodiments, the control circuit 312 may render the first, second, and/or third switching circuits 324A, 324B, and/or 324C conductive in a before attempting to open the first and/or second relays 310A, 310B in a similar fashion as described herein with respect to attempting to close the first and/or second relays 310A. 310B.

In addition, the control circuit 312 may be configured to render one or more of the first, second, and third switching circuits 324A, 324B, 324C conductive at startup (e.g., when power is first provided to the control circuit). For example, the control circuit 312 may be configured to render the first switch circuit 324A conductive for a short period of time after startup to determine if the second hot voltage $V_{H2}$ is present at the second hot terminal H2. If the second hot voltage $V_{H2}$ is not present at the second hot terminal H2, the control circuit 312 may be configured to render the first switching circuit 324A non-conductive. The control circuit 312 may be configured to render the third switching circuit 324C conductive to determine if the second hot detect circuit 322B is generating the switched-hot detect signal $V_{D-SH2}$. If the second hot detect circuit 322B is generating the switched-hot detect signal $V_{D-SH2}$ the control circuit 312 may assume that the hot and switched hot terminals H2, SH2 are wired up backwards, e.g., that the switched-hot terminal SH2 is coupled to the hot side of the AC power source 302B. Thus, during normal operation, the control circuit 312 may render the first switch circuit 324A conductive before attempting to close or open the relay 310B, and non-conductive after detecting an edge of hot detect signal $V_{D-SH2}$. In addition and for example, the control circuit 312 may render the third switching circuit 324C conductive at all times during normal operation, such that the switched-hot detect circuit 322B always generates the switched-hot detect signal $V_{D-SH2}$. The control circuit 312 may be configured to render the first switching circuit 324A conductive to cause the second hot detect circuit 320B to begin generating the second hot detect signal $V_{D-H2}$. The control circuit 312 may then monitor the second hot detect signal $V_{D-H2}$ from the second hot detect circuit 320B, and render the third switching circuit 324C non-conductive after detecting an edge on the second hot detect signal $V_{D-H2}$.

What is claimed is:

1. An electric load control device, comprising:
   controllably conductive device reversibly transitionable between an electrically conductive state and an electrically non-conductive state, the controllably conductive device having a hot voltage input and a switched hot voltage output;
   a first edge detect circuit series connected with a first switching circuit coupled between the switched hot voltage output from the controllably conductive device and one of: a neutral conductor or a ground conductor;
   a second edge detect circuit series connected with a second switching circuit coupled between the hot voltage input to the controllably conductive device and one of: the neutral conductor or the ground conductor; and
   a control circuit operatively coupled to the controllably conductive device, the first switching circuit and the second switching circuit, the control circuit to, upon start-up of the electrical load control device:
     detect the hot voltage connection and switched hot voltage connection to the controllably conductive device;
     determine a controllably conductive device open response time using the controllably conductive device, the first edge detect circuit, and the first edge detection circuit; and
     determine a controllably conductive device close response time using the controllably conductive device, the first edge detect circuit, and the first edge detection circuit.

2. The electric load control device of claim 1, wherein to determine the controllably conductive device close response time, the control circuit to further:
   place the first switching circuit in the non-conductive state;
   communicate a command to the controllably conductive device to cause the controllably conductive device to transition to the electrically conductive state;
   receive an edge detect signal from the first edge detect circuit, the edge detect signal indicative of an increasing switched hot voltage;
   determine the device close response time as the interval between communication of the command to the controllably conductive device and the receipt of the edge detect signal from the first edge detect circuit.

3. The electric load control device of claim 2, wherein the control circuit to further:
   cause a storage of data representative of the determined close response time of the controllably conductive device in a communicatively coupled memory circuit.

4. The electric load control device of claim 3, wherein to determine the controllably conductive device open response time, the control circuit to further:
   place the first switching circuit in the conductive state;
   communicate a command to the controllably conductive device to cause the controllably conductive device to transition to the electrically non-conductive state;
   receive an edge detect signal from the first edge detect circuit, the edge detect signal indicative of a falling switched hot voltage;
   determine the device open response time as the interval between communication of the command to the controllably conductive device and the receipt of the edge detect signal from the first edge detect circuit.

5. The electric load control device of claim 4, wherein the control circuit to further:
   cause a storage of data representative of the determined open response time of the controllably conductive device in the memory circuit.

6. The electric load control device of claim 4, the control circuit to further:
   cause the first switching circuit to transition to the non-conductive state responsive to receipt of the edge detect signal from the first edge detect circuit.

7. The electric load control device of claim 1, wherein to detect a hot voltage at the hot voltage input, the control circuitry to, responsive to an initial power-up of the electric load control device:
- position the first switching circuit in the non-conductive state;
- position the second switching circuit in the non-conductive state;
- cause the second switching circuit to transition to the conductive state; and
- determine whether the second edge detect circuit detects a rising edge of the hot voltage at the hot voltage input of the controllably conductive device.

8. The electric load control device of claim 7, wherein to detect a hot voltage at the switched hot voltage input, the control circuitry to, responsive to an initial power-up of the electric load control device:
- position the first switching circuit in the non-conductive state;
- position the second switching circuit in the non-conductive state;
- cause the first switching circuit to transition to the conductive state; and
- determine whether the first edge detect circuit detects a rising edge of the hot voltage at the switched hot voltage input of the controllably conductive device.

9. An electric load control method, comprising:
- detecting, by a control circuit, a hot voltage connection to an operatively coupled controllably conductive device reversibly transitionable between an electrically conductive state and an electrically non-conductive state, wherein the controllably conductive device includes a hot voltage input and a switched hot voltage output;
- detecting, by the control circuit, a switched hot voltage connection to the controllably conductive device;
- determining, by the control circuit, an open response time of the controllably conductive device using a first edge detect circuit series connected with a first switching circuit, the first edge detect circuit and the series-coupled first switching circuit coupled between the switched hot voltage output from the controllably conductive device and one of: a neutral conductor or a ground conductor, and the first edge detection circuit; and
- determining, by the control circuit, a close response time of the controllably conductive device using a second edge detect circuit series connected with a second switching circuit, the second edge detect circuit and the series-coupled second switching circuit coupled between the hot voltage input to the controllably conductive device and one of: the neutral conductor or the ground conductor.

10. The method of claim 9, wherein determining the close response time of the controllably conductive device further comprises:
- placing, by the control circuit, the first switching circuit in the non-conductive state;
- communicating, by the control circuit, a command to the controllably conductive device to cause the controllably conductive device to transition to the electrically conductive state;
- receiving, by the control circuit, an edge detect signal from the first edge detect circuit, the edge detect signal indicative of an increasing switched hot voltage; and
- determining, by the control circuit, the close response time of the controllably conductive device as the interval between communication of the command to the controllably conductive device and the receipt of the edge detect signal from the first edge detect circuit.

11. The method of claim 10, further comprising:
- causing, by the control circuit, a storage of data representative of the determined close response time of the controllably conductive device in a communicatively coupled memory circuit.

12. The method of claim 11, wherein determining the open response time of the controllably conductive device further comprises:
- placing, by the control circuit, the first switching circuit in the conductive state;
- communicating, by the control circuit, a command to the controllably conductive device to cause the controllably conductive device to transition to the electrically non-conductive state;
- receiving, by the control circuit, an edge detect signal from the first edge detect circuit, the edge detect signal indicative of a falling switched hot voltage;
- determining, by the control circuit, the open response time of the controllably conductive device as the interval between communication of the command to the controllably conductive device and the receipt of the edge detect signal from the first edge detect circuit.

13. The method of claim 12, further comprising:
- causing, by the control circuit, a storage of data representative of the determined open response time of the controllably conductive device in the memory circuit.

14. The method of claim 12, further comprising:
- causing, by the control circuit, the first switching circuit to transition to the non-conductive state responsive to receipt of the edge detect signal from the first edge detect circuit.

15. The method of claim 9, wherein detecting the hot voltage at the hot voltage input of the controllably conductive device responsive to an initial power-up of the electric load control device, further comprises:
- causing, by the control circuit, the first switching circuit to transition to the non-conductive state;
- causing, by the control circuit, the second switching circuit to transition to the non-conductive state;
- causing, by the control circuit, the second switching circuit to transition to the conductive state; and
- determining, by the control circuit, whether the second edge detect circuit detects a rising edge of the hot voltage at the hot voltage input of the controllably conductive device.

16. The method of claim 15, wherein detecting the hot voltage at the switched hot voltage input of the controllably conductive device responsive to the initial power-up of the electric load control device, further comprises:
- causing, by the control circuit, the first switching circuit to transition to the non-conductive state;
- causing, by the control circuit, the second switching circuit to transition to the non-conductive state;
- causing, by the control circuit, the first switching circuit to transition to the conductive state; and
- determining, by the control circuit, whether the first edge detect circuit detects a rising edge of the hot voltage at the switched hot voltage input of the controllably conductive device.

17. A non-transitory, machine-readable, storage device that includes instructions that, when executed by a control circuit in an electric load controller, cause the control circuit to:
- detect a hot voltage connection to an operatively coupled controllably conductive device reversibly transitionable between an electrically conductive state and an electrically non-conductive state, wherein the controllably conductive device includes a hot voltage input and a switched hot voltage output;

detect a switched hot voltage connection to the controllably conductive device;

determine an open response time of the controllably conductive device using a first edge detect circuit series connected with a first switching circuit, the first edge detect circuit and the series-coupled first switching circuit coupled between the switched hot voltage output from the controllably conductive device and one of: a neutral conductor or a ground conductor, and the first edge detection circuit; and determine a close response time of the controllably conductive device using a second edge detect circuit series connected with a second switching circuit, the second edge detect circuit and the series-coupled second switching circuit coupled between the hot voltage input to the controllably conductive device and one of: the neutral conductor or the ground conductor.

18. The non-transitory, machine-readable, storage device of claim 17, wherein the instructions that, when executed, cause the control circuit to determine the close response time of the controllably conductive device further cause the control circuit to:

cause the first switching circuit to transition to a non-conductive state;

communicate a command to the controllably conductive device to cause the controllably conductive device to transition to the electrically conductive state;

receive an edge detect signal from the first edge detect circuit, the edge detect signal indicative of an increasing switched hot voltage; and determine the close response time of the controllably conductive device as the interval between communication of the command to the controllably conductive device and the receipt of the edge detect signal from the first edge detect circuit.

19. The non-transitory, machine-readable, storage device of claim 18 wherein the instructions, when executed by the control circuit in the electric load controller, further cause the control circuit to:

cause a storage of data representative of the determined close response time of the controllably conductive device in a communicatively coupled memory circuit.

20. The non-transitory, machine-readable, storage device of claim 19, wherein the instructions that, when executed, cause the control circuit in the electric load controller to determine the open response time of the controllably conductive device further cause the control circuit to:

transition the first switching circuit to the conductive state;

communicate a command to the controllably conductive device to cause the controllably conductive device to transition to the electrically non-conductive state;

receive an edge detect signal from the first edge detect circuit, the edge detect signal indicative of a falling switched hot voltage;

determine the open response time of the controllably conductive device as the interval between communication of the command to the controllably conductive device and the receipt of the edge detect signal from the first edge detect circuit.

21. The non-transitory, machine-readable, storage device of claim 20, wherein the instructions, when executed by a control circuit in an electric load controller, further cause the control circuit to:

cause a storage of data representative of the determined open response time of the controllably conductive device in the memory circuit.

22. The non-transitory, machine-readable, storage device of claim 20, wherein the instructions, when executed by a control circuit in an electric load controller, further cause the control circuit to:

cause the first switching circuit to transition to the non-conductive state responsive to receipt of the edge detect signal from the first edge detect circuit.

23. The non-transitory, machine-readable, storage device of claim 18, wherein the instructions that, when executed, cause the control circuit in the electric load controller to detect the hot voltage at the hot voltage input of the controllably conductive device, responsive to an initial power-up of the electric load control device, further cause the control circuit to:

cause the first switching circuit to transition to the non-conductive state;

cause the second switching circuit to transition to the non-conductive state;

cause the second switching circuit to transition to the conductive state; and determine whether the second edge detect circuit detects a rising edge of the hot voltage at the hot voltage input of the controllably conductive device.

24. The non-transitory, machine-readable, storage device of claim 23, wherein the instructions that, when executed, cause the control circuit in the electric load controller to detect the hot voltage at the switched hot voltage input of the controllably conductive device, responsive to the initial power-up of the electric load control device, further cause the control circuit to:

cause the first switching circuit to transition to the non-conductive state;

cause the second switching circuit to transition to the non-conductive state;

cause the first switching circuit to transition to the conductive state; and determine whether the first edge detect circuit detects a rising edge of the hot voltage at the switched hot voltage input of the controllably conductive device.

* * * * *